Figure 1:
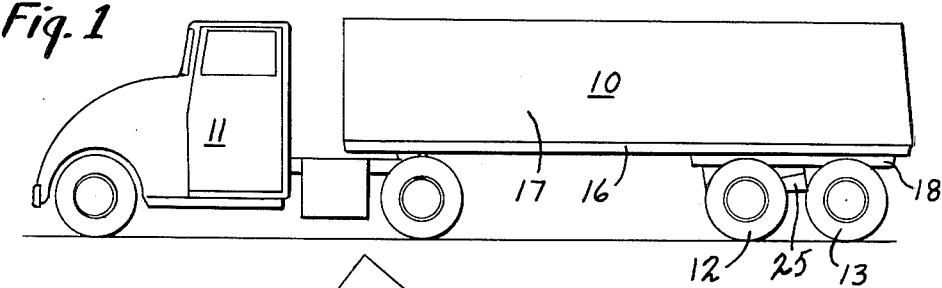

March 27, 1962     L. J. TRIPODI     3,027,197
LOAD-DUMPING VEHICLE AND METHOD
Filed April 20, 1960     2 Sheets-Sheet 1

INVENTOR.
Louis J. Tripodi
BY
Attorney

INVENTOR.
Louis J. Tripodi

United States Patent Office 3,027,197
Patented Mar. 27, 1962

3,027,197
LOAD-DUMPING VEHICLE AND METHOD
Louis J. Tripodi, Lake Milton, Ohio, assignor to The Lodestar Corporation, Niles, Ohio, a corporation of Ohio
Filed Apr. 20, 1960, Ser. No. 23,410
7 Claims. (Cl. 298—20)

The present invention relates to a load-dumping vehicle and method, more particularly to a semi-trailer construction and a method of dumping the load carried thereby, and the principal object of the invention is to provide new and improved constructions of the character described.

Load-dumping semi-trailers of the so-called frameless type have found wide acceptance because they are inherently lighter for a given load capacity than the frame type of dumping semi-trailers. Such frameless semi-trailers, in common with most heavy-load carrying trailers, employ multiple wheel supporting axles spaced from each other longitudinally of the trailer axis.

In the most common arrangement, two wheel supporting axles are disposed at the rear of the trailer, each axle being spring-connected to the trailer body and the axles being connected together for simultaneous movement in opposite directions toward and away from the trailer body as the trailer transverses road irregularities to thus divide in a predetermined proportion the load carried by respective axle springs. Unfortunately, prior-art, frameless dumping semi-trailers of the tandem, articulated axle type above described have had a serious deficiency. Such deficiency has been the tendency of the springs on the rearmost axle to break during the dumping operation. Such breakage results because as the forward portion of the trailer is tilted about the axis of the rearmost axle during the dumping operation, the entire load of the trailer is concentrated upon the rearmost axle springs. Since such springs are designed to share the support of the trailer load with the foremost axle springs, the imposition of the entire load on the rearmost axle springs overloads them and thus they eventually break.

The present invention provides an apparatus and method whereby a frameless semi-trailer may be tilted for dumping without overstressing any of the trailer springs. Other advantages will become apparent from a study of the following description and from the drawings appended hereto.

Figure 2:
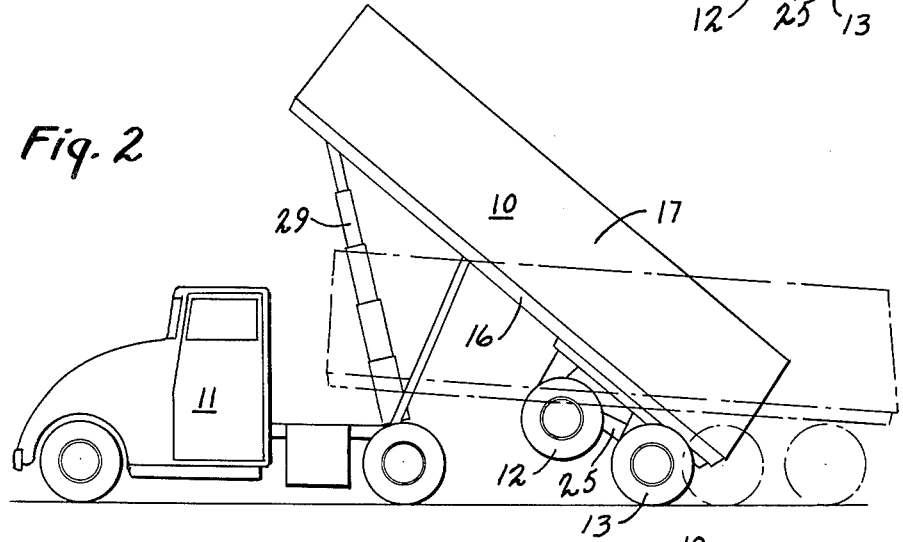
Figure 3:
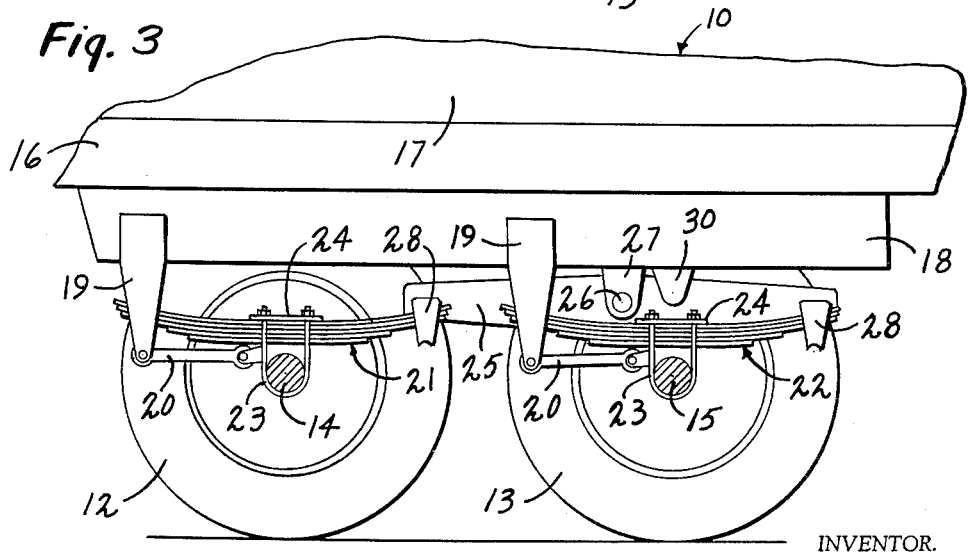
Figure 4:
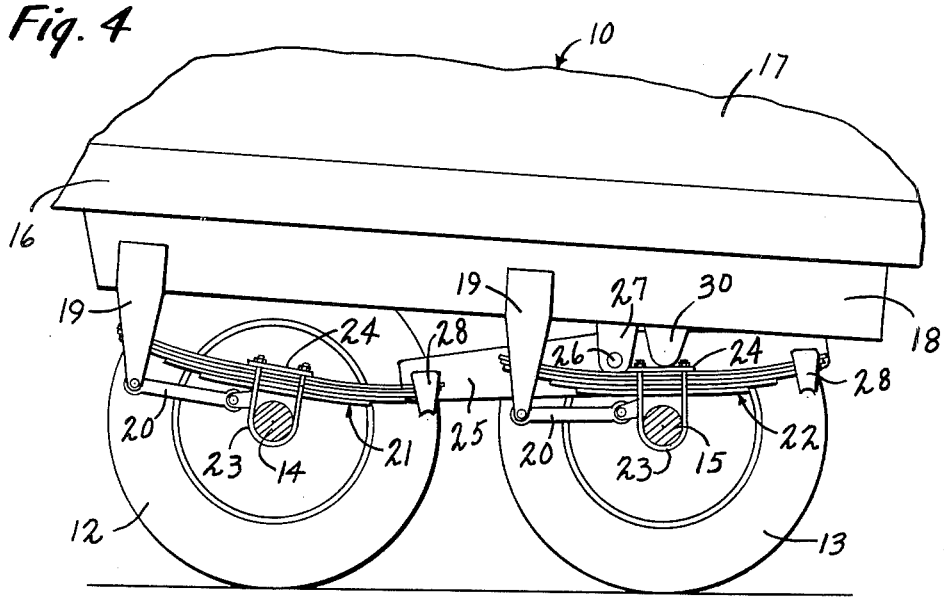
Figure 5:
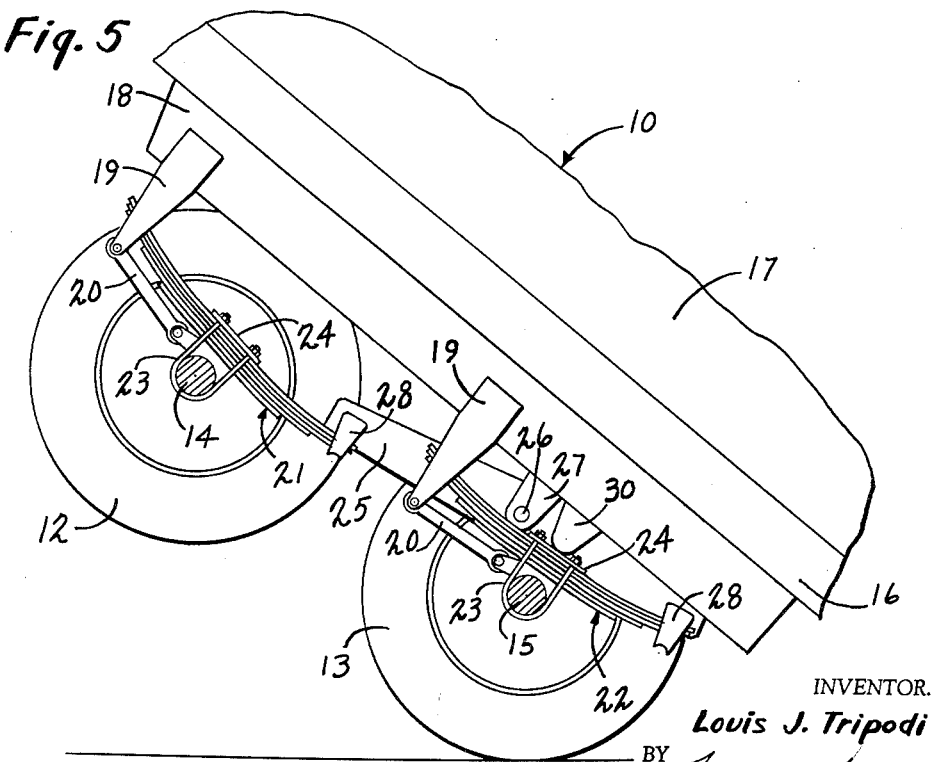

In the drawings accompanying this specification and forming a part of this application there is shown, for purpose of illustration, an embodiment which the invention may assume, and in such drawings:

FIGURE 1 is a side elevational view of a load-dumping semi-trailer of the frameless type, together with the tractor which supports its forward end, shown positioned for load transport, FIGURE 2 is a view similar to FIGURE 1 but showing the trailer fully elevated for dumping in full lines and partially elevated in phantom lines, FIGURE 3 is an enlarged, side elevational view of the under carriage of the trailer during load transport, the wheels on the near side being removed to show the underlying structure, FIGURE 4 is a view similar to FIGURE 3 but showing the disposition of parts when the trailer is elevated to the phantom line position seen in FIGURE 2, and FIGURE 5 is a view similar to FIGURE 3 but showing the disposition of parts when the trailer is elevated to the full line position seen in FIGURE 2.

FIGURE 1 illustrates a trailer 10 whose forward portion is supported upon and is pivotally secured in the usual manner to a tractor 11. The rear portion of the trailer is supported upon road wheels 12 and 13 respectively secured to axles 14 and 15 (FIGURE 3) spaced from each other longitudinally of the trailer. Wheels 12 and 13 are duplicated on respective sides of the trailer as will be clear. Underlying the main body of the trailer and forming its backbone are a pair of the usual, longitudinally extending, main frame members 16( only one of which may be seen) which are disposed in spaced relation on respective sides of the trailer's longitudinal axis. Such members are preferably welded to the underside of the trailer body 17 to form an integral structure therewith. Secured beneath each member 16 is a beam member 18 to which the about to be described undercarriage is secured.

With reference to FIGURE 3, it will be seen that disposed ahead of each axle 14, 15 is a spring support 19 which depends from the beam member 18. Pivotally secured to the lower portion of a respective spring support is the forward end of a link 20 whose rear end is pivotally secured to a respective axle. Links 20 maintain the axles 14, 15 in predetermined transverse relation with the longitudinal axis of the trailer, it being understood that such links and the spring supports are duplicated on each side of the trailer.

Connecting respective axles to the trailer are leaf springs 21, 22 whose intermediate portions overlie and are rigidly secured to respective axles by means of, for example, the usual U-bolts 23. In the present embodiment, such bolts pass through apertures in plates 24 which overlie respective springs and which, when drawn toward the axles by the bolts, tightly clamp the springs thereagainst. Each spring support is slotted to pass the forward end of a respective spring and each provides a downwardly facing surface (not shown) which bears against the upwardly facing forward spring end. It will be understood that a pair of springs 21 are secured to axle 14 and a pair of springs 22 are secured to axle 15, the springs of respective pairs being disposed on respective trailer sides to cooperate with respective spring supports.

Means are provided for connecting together the rear ends of springs 21, 22 disposed on respective sides of the trailer, such means presently comprising a walking beam 25, or equalizer, whose intermediate portion is pivoted upon the axis of a trunnion 26 extending transversely of the trailer axis and supported by brackets 27 secured to respective members 18. It is to be understood that a walking beam 25 is provided for each side of the trailer, each connecting together the springs on a respective side thereof. In order to avoid interference between each walking beam and a respective beam member 18, each walking beam is disposed inwardly (that is toward the trailer's longitudinal axis) of respective members 18. Each walking beam carries a spring hanger 28 at respective ends, such hangers extending outwardly of the longitudinal axis of the trailer to underlie a respective member 18 and to overlie the rear end of a respective adjoining spring. Hangers 28 are similar to supports 19 in that each also provides a downwardly facing surface (not shown) which bears against an upwardly facing rear spring end.

Briefly, the operation of the articulated, tandem axle suspension thus far described will be as follows during normal transport operations: In the event a wheel 12 on either side strikes an obstruction in the road, such wheel will immediately be driven upwardly. In the absence of the walking beam, or other articulated construction, spring 21 would be very highly stressed since it might momentarily carry considerably more than its proportionate share of the trailer weight. However, because of the walking beam construction, upward movement of a wheel 12 will be translated to corresponding downward movement of the adjoining wheel 13 thus maintaining unchanged the proportionate share of trailer weight carried by the springs 21, 22. Such action also minimizes shock transmitted to the trailer body caused by striking the obstruction. In the event wheel 12 falls into a depression, reverse operation will occur in that wheel 13 will move upwardly. Clearly, a similar type of reaction between the wheels will take place if wheel 13 strikes an obstruction or falls into a depression.

If the forward portion of the trailer is now elevated, as by means of the telescoping fluid cylinder 29 seen in FIGURE 2, from the normal load-transporting position illustrated in FIGURE 1 toward the full line, load-dumping position illustrated in FIGURE 2, the construction thus far described will function in the following manner: During initial elevation of the forward trailer portion, the trailer will tilt about the axis of trunnion 26 with both axles and their respective springs continuing to support their proportionate share of the trailer weight. A comparision of FIGURE 4 with FIGURE 3 will illustrate that during such elevation, relative movement in a direction away from each other occurs between the trailer body and the axle 14 while relative movement in a direction toward each other occurs between the body and the axle 15.

Because movement of the axles 14, 15 toward and away from the trailer body is limited, such limitation usually occurring when the rearmost walking beam spring hanger 28 abuts the underside of the member 18, a point of elevation will be reached when further pivotal movement of the walking beam, corresponding to tilting of the trailer about the axis of trunnion 26, can no longer take place. At such point, further elevation of the trailer will raise the wheels 12 from the ground thus concentrating the entire weight of the trailer upon the rear wheels 13 and the rear springs 22. It is this concentration of weight upon the springs 22 which results in their breakage.

To prevent such spring breakage and referring once again to FIGURE 3, the present invention contemplates securing a rigid, depending abutment 30, such as a steel block, to the underside of member 18 immediately above the plate 24 overlying spring 22. Two such abutments will, of course, be employed, one on each side of the trailer. In the present embodiment, the spacing between block 30 and the adjoining plate 24, with the trailer loaded, is such that the block will engage the plate prior to abutment of the rear spring hangers 28 of the walking beams with the underside of respective members 18. This is illustrated at FIGURE 4 wherein the trailer has been elevated from the position seen in FIGURE 1 to the phantom line position seen in FIGURE 2.

Further elevation of the trailer from the phantom line position seen in FIGURE 2 and the position seen in FIGURE 4 toward the full line position seen in FIGURE 2 and the position seen in FIGURE 5 will merely tilt the trailer about the axis of the axle 15 and raise the wheels 12 of the axle 14 from engagement with the ground. Note that with the block 30 engaged with the plate 24, a solid connection is provided between the axle 15 through the intermediate spring portion to the trailer body. Therefore, further deflection of the rear springs 22 from their normal-load positions seen in FIGURES 3 and 4 with attendant spring overloading will be positively prevented.

Accordingly, further elevation not only does not place an increased load on the springs 22, but the load thereon will actually be reduced to nothing if sufficient space exists to prevent engagement between the walking beam rear spring hangers 28 and the underside of respective members 18. In such case, such walking beam will merely tilt in a clockwise direction (in the position of parts viewed) until springs 22 are relaxed. In any event, the springs 21 will be deprived of their loads when the trailer has been elevated sufficiently to raise the wheels 12 from the ground.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. In a load-dumping vehicle having a tiltable, load-carrying body and also having a pair of road-wheel supporting axles spaced-apart from each other along the normal direction of vehicle movement, the combination comprising a pair of springs normally interposed between respective axles and the vehicle body and each spring normally supporting a proportionate share of vehicle weight when said body is in its load-carrying position, means for maintaining a predetermined balance between the weight supported by each of said springs, and means responsive to tilting of said body from its load-carrying position to a load-dumping position for relieving said springs of their normal weight-supporting function.

2. In a trailer construction of the type having a load-carrying body providing a pair of road-wheel supporting axles spaced-apart from each other along the normal direction of trailer movement, the combination comprising a pair of springs interposed between respective axles and the trailer body and each spring deflecting to a predetermined position under full load to each support a proportionate share of trailer weight when said body is in its load-carrying position, equalizing means connecting said springs together and movable with respective springs a limited amount to effect relative movement in a direction away from each other between the foremost axle and the body upon relative movement in a direction toward each other between the rearmost axle and said body to thereby maintain a predetermined balance between the weight supported by each of said springs, means for elevating the forward portion of said trailer body and for tilting the latter about the axis of said rearmost axle to thus dump the body contents, and means responsive to tilting of said body from its load-carrying position to a load-dumping position and interrupting movement between said rearmost axle and said body in the direction aforesaid to prevent substantial deflection of the spring of said rearmost axle beyond its normal, full-load position.

3. The construction of claim 2 wherein said movement interrupting means comprises interengageable abutment means in part carried by said body and in part carried by said rearmost axle.

4. In a trailer construction of the type having a load-carrying body providing a pair of road-wheel supporting axles spaced-apart from each other along the normal direction of trailer movement, the combination comprising a leaf spring extending transversely of each axle and each spring having an intermediate portion secured to a respective axle and one end portion engaged with the trailer body, each spring deflecting to a predetermined position under full load to each support a proportionate share of trailer weight when said body is in its load-carrying position, a rock lever having an intermediate portion pivoted to said body and end portions each engaged with the other end of respective springs, said rock lever swinging about its pivot and said springs being movable therewith a limited amount to effect relative movement in a direction away from each other between the foremost axle and the body upon relative movement in a direction toward each other between the rearmost axle and said body to thereby maintain a predetermined balance between the weight supported by each of said springs, means for elevating the forward portion of said trailer body and for tilting the latter about the axis of said rearmost axle to thus dump the body contents, and abutment means in part carried by said body and in part carried by said rearmost axle and interengaging upon tilting of said body from its load-carrying position to a load-dumping position and limiting movement between said rearmost axle and said body in the direction aforesaid and preventing substantial deflection of the spring of said rearmost axle beyond its normal, full-load position.

5. The construction of claim 4 wherein said abutment means comprises a rigid, depending projection carried by said trailer body and a rigidly supported, upwardly facing surface carried by said rearmost axle.

6. The construction of claim 4 wherein each intermediate spring portion overlies its respective axle and wherein said abutment means comprises a rigid, depending projection carried by said body and an upwardly facing surface rigidly supported by the intermediate portion of that spring which is secured to said rearmost axle.

7. The construction of claim 6 wherein said trailer is of the type whose forward portion is pivotally supported upon a draft vehicle and whose rear portion carries said pair of axles and is supported thereby.

References Cited in the file of this patent
UNITED STATES PATENTS

| | | |
|---|---|---|
| 1,610,881 | Reinsch | Dec. 14, 1926 |
| 2,853,341 | Morse | Sept. 23, 1958 |